United States Patent [19]

Huber et al.

[11] 4,041,339

[45] Aug. 9, 1977

[54] DYNAMOELECTRIC MACHINE WITH BRUSH HOLDING STRUCTURE

[75] Inventors: David A. Huber, Trotwood; Roy C. Schoen, West Milton, both of Ohio

[73] Assignee: General Motors Corporation, Detroit, Mich.

[21] Appl. No.: 630,212

[22] Filed: Nov. 10, 1975

[51] Int. Cl.² .................................... H02K 13/00
[52] U.S. Cl. ................................ 310/239; 310/246
[58] Field of Search .......................... 310/239–248, 310/46, 220, 238, 89

[56] References Cited

U.S. PATENT DOCUMENTS

| | | | |
|---|---|---|---|
| 848,182 | 3/1907 | Lindau | 310/246 |
| 2,444,826 | 7/1948 | Happe | 310/247 |
| 3,165,654 | 1/1965 | Mabuchi | 310/46 |
| 3,270,230 | 8/1966 | Schultz | 310/239 |
| 3,431,442 | 3/1969 | Mabuchi | 310/246 X |
| 3,475,635 | 10/1969 | Mabuchi | 310/238 |
| 3,742,272 | 6/1973 | Shattuck et al. | 310/220 |
| 3,873,864 | 3/1975 | Apostoleris | 310/89 |

Primary Examiner—Donovan F. Duggan
Attorney, Agent, or Firm—Robert M. Sigler

[57] ABSTRACT

A dynamoelectric machine includes a member rotatably receiving one end of the rotor and forming part of the case, the member having a plurality of brush boxes each having a first opening adjacent the commutator and a second opening through the outside of the case at a right angle to the first opening. A brush is inserted into each brush box through the second opening and is biased toward the commutator to the first opening by a V-shaped spring inserted apex first through the second opening behind the brush, one leg of each V-shaped engaging the brush and the other end being attached to a terminal portion engaging the rotor receiving member to provide a base for the spring and an external electrical connection for the brush.

1 Claim, 4 Drawing Figures

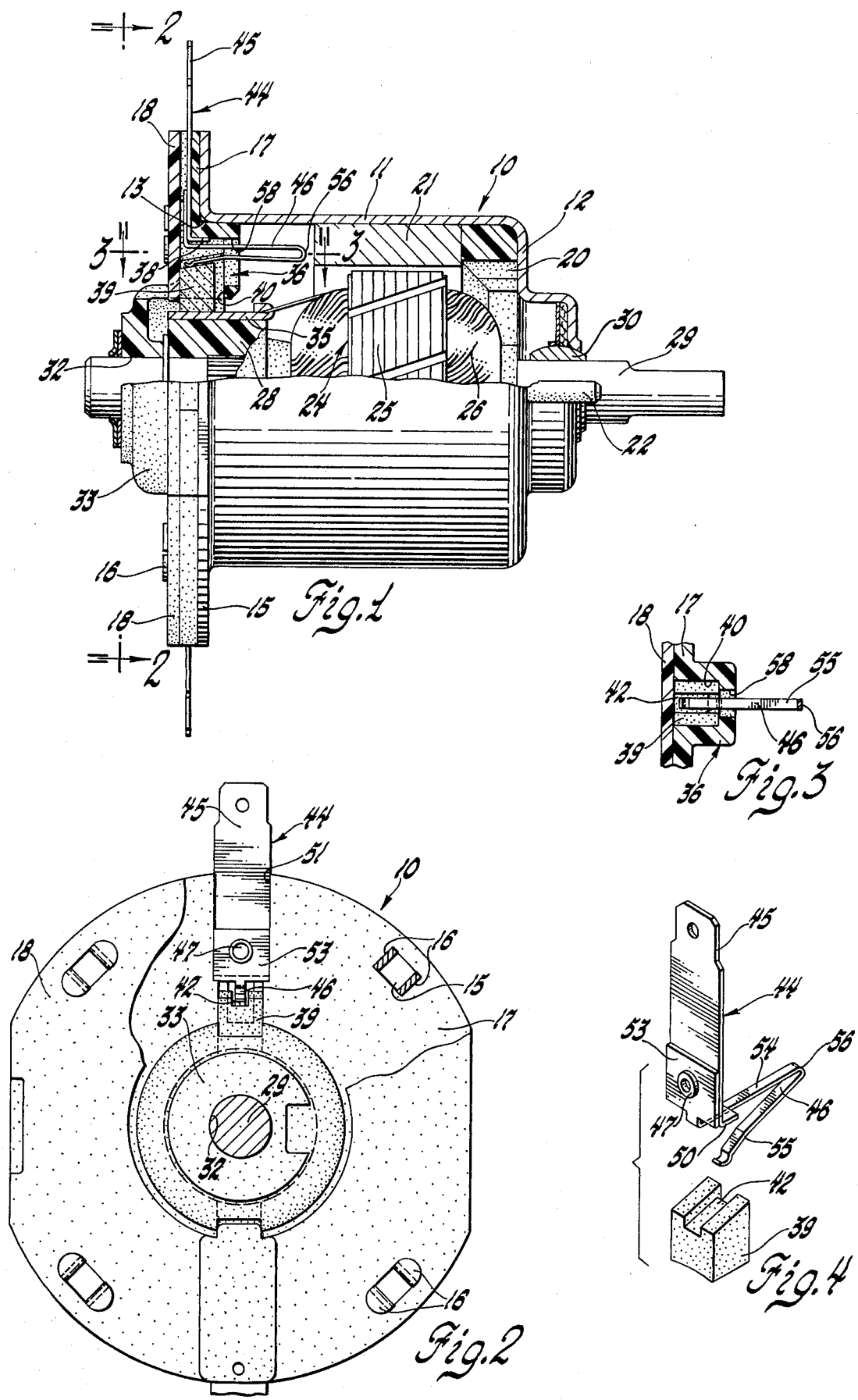

DYNAMOELECTRIC MACHINE WITH BRUSH HOLDING STRUCTURE

SUMMARY OF THE INVENTION

This invention relates to dynamoelectric machines adapted for convenient assembly in mass production and particularly structure in such a dynamoelectric machine to support one or more brushes in engagement with a conventional commutator and conduct current between said brushes and corresponding external terminals.

This invention provides for easy drop-in assembly of the brushes, springs and connectors after the commutator carrying rotor and other internal elements have been installed in the machine so that the presence of such spring loaded brushes does not hinder such installation. Moreover, this invention provides a brush connector for each brush, each brush connector comprising a terminal portion for engagement with the external case and external electrical connection and a spring portion effective to bias the brush against the commutator and conduct electrical current between the brush and the terminal portion. The brushes and brush connectors are adapted to be inserted into appropriate brush boxes in a member comprising part of the external case and to be effective to perform their functions upon such insertion.

Further details and advantages of this invention will be apparent from the accompanying drawings and following description of a preferred embodiment.

SUMMARY OF THE DRAWINGS

FIG. 1 shows a partially cutaway elevational view of a dynamoelectric machine according to this invention.

FIG. 2 is a section view along line 2—2 in FIG. 1.

FIG. 3 is a section view along line 3—3 in FIG. 1.

FIG. 4 is an exploded view of a brush and brush connector for use in the dynamoelectric machine of FIG. 1.

DESCRIPTION OF A PREFERRED EMBODIMENT

Referring to FIG. 1, a dynamoelectric machine 10 has a generally cylindrical case 11 formed from steel with a closed end 12 and an open end 13. The open end 13 of case 11 forms a flange 15 from which are punched a plurality of tabs 16. An end cap 17 and an end cover 18 are disposed adjacent flange 15 to close the open end of case 11, the tabs 16 extending through appropriate openings in end cap 17 and end cover 18 and being crimped over to retain those members.

Within case 11, a magnet retention member 20 helps hold a plurality of arcuate permanent magnets 21 against the inside of case 11 and may be provided with one or more studs 22 projecting through appropriate openings in the closed end 12 of case 11 to circumferentially orient the magnets and/or provide mounting studs for the dynamoelectric machine 10.

Within case 11 a rotor 24 comprises a core 25, windings 26 and a commutator 28 on a shaft 29. Rotor 24 is rotatably mounted with one end of shaft 29 in a bearing 30 in the closed end 12 of case 11 and the other end of shaft 29 received in an opening 32 in a central portion 33 of end cap 17. End cap 17 is made of a phenolic plastic containing graphite or a similar lubricant so that opening 32 serves as a bearing for shaft 29. Commutator 28, in this embodiment, comprises a plurality of conducting bars 35 in a cylindrical or drum-shaped arrangement in a conventional manner.

End cap 17 has formed therein a pair of brush boxes 36 on opposite sides of the commutator 28. Brush boxes 36 have walls to retain a brush but are provided with a number of openings. A first opening 38 allows insertion of a brush 39 into brush box 36 from outside dynamoelectric machine 10 before end cover 18 is installed during assembly. In this embodiment, opening 38 is an axial opening.

A second opening 40, an inner radial opening in this embodiment, allows brush 39 to move partially out of brush box 36 into engagement with commutator 28. This opening 40 is necessarily at an approximate right angle to the first opening 38 in any embodiment of this invention. For instance, in an embodiment including a disk type commutator with axially advancing brushes, opening 40, providing access to the commutator, would be axial in direction while opening 38, allowing insertion of the brushes, would be radial.

Brush 39, viewed from the top in FIG. 4, has a generally square cross section, a slightly concave bottom to fit the surface of commutator 28 and an axially extending, axially slanted groove 42 for receiving a spring. The slant of the groove 42 is such, as seen in FIG. 1, as to create an axial component of the generally radial force exerted on brush 39 to help retain it within brush box 36.

Referring to FIGS. 1, 2 and 4, a brush connector 44 comprises two parts: a terminal portion 45 and a generally V-shaped spring 46 riveted together at 47.

Terminal portion 45 includes a small right angled bend 50 and is adapted to fit into a corresponding depression 51 in end cap 17 with bend 50 projecting into opening 38 in brush box 36 to serve as a base for the V-shaped spring 46. Terminal portion 45 is made of a conducting metal and projects radially outward beyond end cap 17 to provide an external electrical connection for the associated brush 39.

V-shaped spring 46 has a connecting portion 53 riveted to terminal portion 45, a first leg 54 projecting at an approximate right angle from terminal portion 45 and a second leg 55 forming a resilient "V" with first leg 54 having an apex 56 with an acute angle at the opposite end of first leg 54 from connecting portion 53. Spring portion 46 is also made from an electrically conductive material to complete the connection between brush 39 and terminal 45 without the use of standard shunts or "pigtails".

In assembly, after the stator structure and rotor are inserted in case 11 and end cap 17 is installed against flange 15, brushes 39 are inserted through openings 38 into brush boxes 36. Brush connectors 44 are then pushed axially into place with V-shaped springs 46 being inserted apex first through opening 38 into brush box 36. Additional openings 58 on the opposite side of brush box 36 from openings 38 allows the apex 56 of springs 46 to pass through brush box 36 into the interior of case 11. The second leg 55 of each spring 46 engages groove 42 in brush 39 and biases it radially inward into engagement with commutator 28 and slightly axially inward against the wall of brush box 36. When the brush connectors 44 are fully inserted, terminal portions 45 engage end cap 17 as previously described. With brush connectors 44 installed, end cover 18 is placed over them for their retention and tabs 16 are crimped over to hold all these structures in place.

The embodiments of the invention in which an exclusive property or privilege is claimed are defined as follows:

1. In a dynamoelectric machine having a rotor in a case with a drum shaped commutator at one end thereof, brush holding apparatus adapted for easy installation and removal of brushes and comprising:

a member forming one axial end of the case and receiving one end of the rotor rotatably therein, the member having a pair of diametrically opposed brush boxes formed therein, each brush box having a radial opening adjacent the commutator and an axial opening to the outside of the case, whereby brushes can be inserted into the brush boxes from outside the case and then biased at a right angle from the direction of insertion into engagement with the commutator;

a pair of brushes, one within each brush box insertable and removable through the axial opening and engageable with the commutator through the radial opening, each brush having a spring contacting surface on the side opposite the commutator, the spring contacting surface slanting away from the commutator axis in the direction of the inside of the machine;

a pair of brush connectors, one for each brush, each brush connector comprising a terminal portion engaging the axial case member adjacent a brush box and projecting outward therefrom to define a external electrical connection, the terminal portion further including a right angle bend projecting into the associated brush box and engaging the side thereof opposite the commutator, the brush connector further including a spring member having a portion attached to the terminal portion, a first leg projecting axially into the brush box adjacent the right angle bend of the terminal portion and a second leg joined to the first leg at the end thereof opposite the connecting portion in an acute-angled apex to form a V-shaped spring between the right angle bend and the brush, the second leg engaging the spring contacting surface of the brush, the shallow slant of the spring-engaging surface transmitting a large radial component of force to bias the brush against the commutator and a smaller axial component of force to help retain the brush within the brush box.

* * * * *